(12) United States Patent
Starick et al.

(10) Patent No.: US 9,670,406 B2
(45) Date of Patent: Jun. 6, 2017

(54) ZINC SULPHIDE PHOSPHOR HAVING PHOTO- AND ELECTROLUMINESCENT PROPERTIES, PROCESS FOR PRODUCING SAME, AND SECURITY DOCUMENT, SECURITY FEATURE AND METHOD FOR DETECTING SAME

(71) Applicants: BUNDESDRUCKEREI GMBH, Berlin (DE); LEUCHTSTOFFWERK BREITUNGEN GMBH, Breitungen (DE)

(72) Inventors: Detlef Starick, Berlin (DE); Manfred Paeschke, Basdorf (DE); Sven Roesler, Eisenach (DE); Jakob Kuen, Berlin (DE); Andreas Deichsel, Berlin (DE); Christian Kunath, Berlin (DE); Monika Voh, Breitungen (DE)

(73) Assignees: LEUCHTSTOFFWERK BREITUNGEN GMBH (DE); BUNDESDRUCKEREI GMBH (DE)

( * ) Notice: Subject to any disclaimer, the term of this patent is extended or adjusted under 35 U.S.C. 154(b) by 0 days.

(21) Appl. No.: 15/105,898

(22) PCT Filed: Dec. 12, 2014

(86) PCT No.: PCT/EP2014/077491
§ 371 (c)(1),
(2) Date: Jun. 17, 2016

(87) PCT Pub. No.: WO2015/091237
PCT Pub. Date: Jun. 25, 2015

(65) Prior Publication Data
US 2016/0312115 A1 Oct. 27, 2016

(30) Foreign Application Priority Data
Dec. 19, 2013 (DE) ........................ 10 2013 114 496

(51) Int. Cl.
*C09K 11/64* (2006.01)
*C09K 11/74* (2006.01)
(Continued)

(52) U.S. Cl.
CPC ............ *C09K 11/644* (2013.01); *B42D 25/36* (2014.10); *B42D 25/387* (2014.10);
(Continued)

(58) Field of Classification Search
CPC . C09K 11/565; C09K 11/584; C09K 11/0811; C09K 11/7771
See application file for complete search history.

(56) References Cited

U.S. PATENT DOCUMENTS 5,156,885 A 10/1992 Budd
5,220,243 A 6/1993 Klinedinst et al.
(Continued)

FOREIGN PATENT DOCUMENTS

CN 1 563 268 A 1/2005
CN 101 130 689 A 2/2008
(Continued)

OTHER PUBLICATIONS

Kunio Ichino et al: "Optical Properties and X-ray Absorption Fine Structure Analysis of ZnS:Cu,CI Thin-Film Phosphors", Japanese Journal of Applied Physics, Bd. 49, Nr. 8, Aug. 20, 2010 (6 pages total).
(Continued)

*Primary Examiner* — David Porta
*Assistant Examiner* — Faye Boosalis
(74) *Attorney, Agent, or Firm* — Stuart H. Mayer; Mayer & Williams PC

(57) ABSTRACT

The present invention relates to a zinc sulphide phosphor and to a process for producing same. The invention further relates to a security document or document of value, to a
(Continued)

security feature and to a method for detecting same. The phosphor according to the invention can act as electroluminescent phosphor and thus be excited by an electrical field, and this can result in emission of electroluminescent light in the blue and/or green color region of the visible spectrum. The phosphor can moreover be excited by UV radiation in the wavelength range than 345 nm to 370 nm, and can thus emit photoluminescent light in the blue color region of the visible spectrum. The phosphor can moreover be excited by UV radiation in the wavelength range from 310 nm in 335 nm, and can thus emit photoluminescent light in the green color region of the visible spectrum.

14 Claims, 4 Drawing Sheets

(51) Int. Cl.
  B42D 25/387 (2014.01)
  G07D 7/12 (2016.01)
  B42D 25/36 (2014.01)
  D21H 21/48 (2006.01)
(52) U.S. Cl.
  CPC ......... *C09K 11/7414* (2013.01); *D21H 21/48* (2013.01); *G07D 7/122* (2013.01)

(56) References Cited

U.S. PATENT DOCUMENTS

| | | |
|---|---|---|
| 6,530,527 B1 | 3/2003 | Ahlers et al. |
| 6,600,416 B2 | 7/2003 | Kappe et al. |
| 7,067,071 B1 | 6/2006 | Kappe et al. |
| 7,427,029 B2 | 9/2008 | Bailleu et al. |
| 8,540,812 B2 | 9/2013 | Krietsch et al. |

FOREIGN PATENT DOCUMENTS

| | | |
|---|---|---|
| DE | 10 2008 050768 B3 | 11/2009 |
| DE | 10 2008 047 636 A1 | 3/2010 |
| EP | 0 964 791 B1 | 12/1999 |
| EP | 1 149 364 B1 | 10/2001 |
| EP | 1 151 057 B1 | 11/2001 |
| EP | 1 059 619 B1 | 2/2003 |
| EP | 1 631 461 B1 | 3/2006 |
| EP | 1 748 903 B1 | 2/2007 |
| WO | 98/24254 A1 | 6/1998 |
| WO | 00/22064 A1 | 4/2000 |
| WO | 01/34723 A1 | 5/2001 |
| WO | 2010/106933 A1 | 9/2010 |

OTHER PUBLICATIONS

Shionoya, S.; Yen, W. M.: "Phosphor Handbook," CRC Press, 1999, pp. 581-621 (21 pages total).

International Search Report mailed Mar. 2, 2015, issued in connection with corresponding International Application No. PCT /EP2014/077491 (6 pages total).

International Preliminary Report on Patentability issued Jun. 21, 2016, in connection with corresponding International Application No. PCT /EP2014/077491 (10 pages total).

ZINC SULPHIDE PHOSPHOR HAVING PHOTO- AND ELECTROLUMINESCENT PROPERTIES, PROCESS FOR PRODUCING SAME, AND SECURITY DOCUMENT, SECURITY FEATURE AND METHOD FOR DETECTING SAME

FIELD

The invention relates to a powdered zinc sulfide phosphor, which, as electroluminescent phosphor, can be excited by an electrical field and moreover has special luminescent properties. The invention relates especially to a zinc sulfide electroluminescent pigment, which differs in a characteristic manner from the electroluminescent phosphors used in conventional thick-layer electroluminescence applications (AC Powder Electroluminescence, ACPEL), and which, therefore, can be used advantageously as security feature in security documents. In addition, the invention relates to a process for producing a zinc sulfide phosphor as well as to a security feature, to a security document, and to a method for detecting and verifying such a security feature.

BACKGROUND

Powdered zinc sulfide electroluminescent phosphors and corresponding ACPEL applications have been known for a long time. The electroluminescence-capable ZnS phosphors are usually doped with copper (Cu) and/or manganese (Mn), wherein, in addition, other monovalent or trivalent ions (for example, the ions of the elements Cl, Br, I and/or Al), which function as coactivators, can be incorporated in the base lattice. The grain size of the synthesized materials is generally in the µm range. The application usually occurs in the form of so-called electroluminescent films, in which the phosphor particles, in the sense of a capacitor arrangement, are arranged between two electrodes and insulating layers and, upon application of an alternating electrical field of, usually, 110 V and 400 Hz, they emit light in the blue, green or orange region of the visible spectrum. Application examples for such electroluminescent films or lamps are display lights, background lights, lighting and marking elements as used in aircraft and motor vehicles, in buildings or for the production of advertising installations.

The zinc sulfide phosphor particles used for producing known electroluminescent films are usually provided with thin water vapor barrier layers, in order to increase the useful life of the films. This coating, which is also referred to as microencapsulation, can occur, for example, by means of processes such as chemical vapor deposition. The layers that completely encase the individual phosphor particles can consist of $SiO_2$, $TiO_2$, $Al_2O_3$ (cf. U.S. Pat. Nos. 5,156,885 A, 5,220,243 A), of oxynitrides of the elements Al, B, Si, Ti (cf. WO 00/022064 A1) or of AlN (cf. WO 98/24254 A1)

It is also known to use microencapsulated or non-encapsulated ZnS-EL pigments in powder form as security features in security documents and documents of value such as, for example, in bank notes, travel passports, identity cards, driver's licenses, etc. (cf. EP 0 964 791 B1). Here, the zinc sulfide electroluminescent phosphors used in these cases for the purpose of protection against counterfeiting (cf. EP 1 151 057 B1) are usually arranged by means of conventional printing technologies (for example, gravure printing, offset printing or screen printing processes) on or in the matrix of the respective security documents, which can consist of paper, plastics, laminated plastics or also of other suitable materials, without in the process seeking to produce or producing a conventional capacitor structure. For authenticity verification, the electroluminescent phosphors thus applied are preferably excited in a contact-free manner with electrical fields, wherein, due to the specific and unconventional arrangement of the electroluminescent pigments in the matrix of the security document, relatively high-frequency high-voltage fields are generally needed in order to ensure a reliable stationary and advantageously also high-speed detection of the resulting luminescence signals (cf. EP 1 059 619 B1, EP 1 149 364 B1 and DE 10 2008 047 636 A1).

An increase of the local field strength of the alternating electrical fields applied for the excitation of the electroluminescence, acting on the electroluminescent phosphors, can also be achieved by arranging, in addition to the EL pigment and in the immediate vicinity thereof, so-called field suppression elements in the corresponding security markings of the security documents and/or documents of value (cf. EP 1 631 461 B1, EP 1 748 903 B1). The field suppression elements are insulated, electrically conductive pigments with high dielectric constants, wherein either metal particles consisting of iron (Fe), copper (Cu), aluminum (Al) and/or silver (Ag), or certain transparent, optically variable multi-layer effect pigments are used.

Electroluminescent security features of the described type have a very high security level and are generally considered to belong to the category of the so-called level 3 features. The authenticity confirmation of corresponding security documents requires special knowledge of the mode of operation of the feature and is associated with very high cost and very strict requirements for the detection technique used.

If, as described in EP 1 748 903 B1, for the purpose of increasing the effective local strength of the excitatory electrical field and thus the signal strength of the resulting electroluminescence of the feature, in addition to the EL phosphors, so-called field suppression elements in the form of electrically conductive, optically variable effect pigments are used, then the feature can have, in addition to the level 3 characteristic, also a corresponding level 1 characteristic. The optical effect of these pigments, which consists of a color change that can be perceived by the observer under different illumination angles and viewing angles, can be used as an additional feature in the authenticity verification.

ZnS phosphors doped with different activator ions can also be excited to luminescence by means of electromagnetic radiation (for example, with UV rays or X-rays), or by means of electron beams. Corresponding applications as phosphors for conventional color picture tubes or as phosphorescent pigments have a long tradition. However, as a general rule, the zinc sulfide phosphors optimized for efficient photoluminescence, cathode luminescence or X-ray luminescence have no electroluminescence or at least no usable electroluminescence. The same applies conversely: the EL pigments used in conventional technical applications as well as those used in security documents and documents of value can be excited to luminescence by electromagnetic radiation and generally cannot or can only very weakly be excited to luminescence by electron beams, which is explained by the fundamentally different luminescence mechanisms of the different luminescence types as well as by the compositions of the EL pigments, which are selected especially for achieving high electroluminescence yields, and by the special production technologies (cf. Shionoya, S.; Yen, W. M.: "Phosphor Handbook," CRC Press, 1999, pages 581-621).

The production of zinc sulfide electroluminescent phosphors occurs in principle on the basis of a multiple-step process of solid state chemistry. For this purpose, the following steps to be carried out one after the other are known from the state of the art, including from EP 1 151 057 B 1:

1. Intensive mixing of the starting substances in powder form
2. High-temperature annealing process in the temperature range between 900° C. and 1.300° C.
3. Washing of the annealed material with $H_2O$ and/or optionally with dilute mineral acids, wet grinding of the annealed material particles
4. Secondary doping of the intermediate product by renewed addition of predetermined quantities of $CuSO_4$
5. Thermal treatment of the dried material at temperatures between 500° C. and 900° C.
6. Washing of the product obtained after the tempering, with $H_2O$, mineral acids such as HCl or $HNO_3$, or in the presence of KCN, for the removal of $Cu_2S$ deposited on the surface
7. Renewed tempering of the dried phosphor powder at 300° C. to 500° C.

The high-temperature process, which is crucial for the formation of the activated and co-doped phosphor base lattice is here carried out regularly in a reducing atmosphere, i.e., this means that the annealing occurs in the presence of a gas mixture consisting of nitrogen and hydrogen, wherein the hydrogen content typically can be as much as 10%.

In the case of the use of highly innovative security features with level 3 status in security documents such as bank notes, travel passports, identity cards, driver's licenses, for example, the disadvantage is that it is then always impossible to demonstrate with certainty the presence of the respective security feature, if the laboratory equipment or the sensor system required for this purpose is not present, or if using it would entail an unjustifiably high expense. This can also apply to a particularly high degree to electroluminescent security features. Additional reasons not to use such security features include, for example, that environmental regulations or safety regulations do not allow carrying out the excitation of the EL pigments with high-frequency high-voltage alternating electrical fields, which is required for authenticity verification. Restrictions of the type described can apply, for example, to the verification of electroluminescent features in bank notes, if the authenticity confirmation is to be carried out in decentralized sorting installations or, on the other hand, in automated bank tellers for individual cash withdrawal or for cash payments. In such cases, it would be highly useful if the electroluminescent feature contained additional features independent of the level 3 characteristic thereof, which could also be used for the authenticity verification, without revealing the operating principle of the level 3 security feature. Preferably, in this alternative process (level 2 status), the authenticity confirmation of the feature should also be possible using detection means that are comparatively easy to handle.

SUMMARY OF THE INVENTION

Based on this aim, the underlying object of the invention is to provide a modified zinc sulfide electroluminescent phosphor, which still has the electroluminescence property thereof, but which additionally has at least one other property that can be used as security feature. In addition, the invention is to provide a corresponding production process as well as a security feature based on this phosphor, a security document with such a security feature, and a method for detecting the additional exclusive properties of the security feature in corresponding security documents.

The mentioned object is attained by a zinc sulfide phosphor according to the appended claim 1. The aim is achieved, furthermore, by a process for producing a zinc sulfide phosphor according to the appended coordinate claim 4 as well as by a phosphor according to the appended coordinate claim 9 that can be produced by this process. Moreover, the object is attained by a security feature according to the appended coordinate claim 10, by a security document or document of value according to the appended coordinate claim 11, and by a method for detecting a security feature in a security document according to the appended coordinate claim 12.

The preferably powdered zinc sulfide phosphor according to the invention, in addition to the specific electroluminescence thereof, shows intense photoluminescence, which can thus be detected by conventional sensors, and which moreover is characterized by a characteristic color change in the case of a variation of the UV excitation conditions.

In particular, the zinc sulfide phosphor according to the invention has a characteristic blue and/or green electroluminescence and an emission, which is also blue, in the case of excitation in the wavelength range between 345 nm and 370 nm, while, in contrast thereto, in the case of excitation with short-wave UV radiation in the wavelength range between 310 nm and 335 nm, it emits green light. Thus, the phosphor emits either blue or green photoluminescence. This color change of the UV-excitable photoluminescence, which is independent of the electroluminescence, can be used as additional authenticity criterion when the phosphor according to the invention is used in security features. The described exclusivity and complexity of the luminescence property is linked to a special phosphor composition, which is indicated below.

The zinc sulfide phosphor according to the invention has the following general chemical formula:

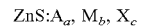

where $0<(a+b+c)<0.12$;
$0.0001<a<0.008$;
$0.6 \cdot a<b<4 \cdot a$, and
$2 \cdot b<c<4 \cdot b$.

A stands for Cu, which can be replaced proportionally with Ag and/or Au. In any case, the phosphor in principle comprises Cu as activator. Preferably, A stands exclusively for Cu.

M stands for Al, which can be replaced proportionally by one or more metals, which are selected from the group comprising the elements Bi, Ga and In. Al and optionally Bi, Ga and/or In occur as trivalent cations $M^{3+}$. In any case, the phosphor in principle comprises Al. Preferably, M stands exclusively for Al.

X stands for one or more halides, which occur as monovalent anions $X^-$ and are selected from the group comprising the elements F, Cl, Br and I.

The ions $M^{3+}$ and $X^-$ act as coactivators.

The exact lattice positions in which the ions of A, M and X are incorporated cannot be determined. In the scientific literature as well, for similar phosphors, there is no consistent opinion regarding the substitution positions. Thus, an alternative notation for the general chemical formula of the phosphor according to the invention, which was established on a purely formal basis, is:

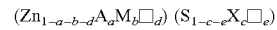

wherein the formula symbol □ stands for vacancies and/or interstitial sites, and the variables d and e in each case represent the proportion of the vacancies and/or interstitial sites.

An alternative simplified notation for the general chemical formula of the phosphor according to the invention is:

ZnS:A, M, X

In this simplified notation, the indices a, b and c are not indicated.

Here, it is a special characteristic of the phosphor according to the invention that it also always contains, in addition to the copper (Cu) functioning as activator, the trivalent cations $M^{3+}$ that are active as coactivators as well as at the same time the monovalent anions $X^-$ that are also active as coactivators. The simultaneous presence of copper and the two different types of coactivators in the zinc sulfide base lattice is a prerequisite for the consistent formation of always at least two different activatable radiation centers, which can be considered a cause for the surprisingly encountered special luminescent properties of the electroluminescent phosphor according to the invention.

The phosphor according to the invention can comprise small quantities of additional elements, provided that they do not negatively affect the above-mentioned characteristic properties thereof and that they do not eliminate the emission intensities to an unacceptable degree.

Practical tests have shown that, in spite of intensive washing out, traces of alkali or alkaline earth elements can be detected analytically in the final product, if they were added in the form of the halides thereof to the starting mixture. To date, it has not been possible to explain unequivocally whether these elements are incorporated in the base lattice or whether they are present in the phosphor in the form of inclusions that cannot be washed out. However, the presence thereof does not lead to a change in the properties of the phosphor according to the invention. Thus, the presence or absence of alkali or alkaline earth ions does not represent a feature that goes beyond the present invention.

In a preferred embodiment, the phosphor according to the invention has the following composition:

ZnS:$Cu_a$, $Al_b$, $I_c$

In this embodiment, A=Cu; M=Al and X=I.

The phosphor according to the invention is preferably in the form of a powder, wherein the mean grain size is preferably between 2 µm and 50 µm; particularly preferably between 2 µm and 20 µm.

Another subject matter of the invention consists of a process for producing a zinc sulfide phosphor, in particular the zinc sulfide phosphor according to the invention.

The synthesis according to the invention of the zinc sulfide EL phosphor, which, in addition to the efficient electroluminescence thereof, has a photoluminescence and a reliably detectable color change of the UV-excitable photoluminescence, requires special conditions. This can be explained according to the current state of knowledge by factors including that the manifestation and effectiveness of the at least two different activatable radiation centers in the ZnS matrix are influenced not only by the special phosphor composition according to the invention but also to a large degree by preparative factors.

First, the invention comprises a step of provision of the starting compounds. The main component of the reaction mixture is zinc sulfide (ZnS), wherein optionally, in addition, certain quantities of sulfur (S) can be added to this base substance. Preferably, elemental sulfur is used as an additional starting substance and mixed with the optional other substances to form a mixture.

In the same way, a chemical compound containing copper (CU) is provided as starting substance. The copper (Cu) needed as activator for the synthesis according to the invention of the zinc sulfide electroluminescent phosphor is generally introduced as copper sulfate ($CuSO_4$) into the mixture of the starting substances. Thus, the chemical compound comprising the copper is preferably copper sulfate. Additionally, an Ag-containing chemical compound and/or an Au-containing chemical compound can also be used. The Ag-containing compound is preferably $AgNO_3$. The Au-containing compound is preferably $Na_3[AuCl_4]$.

Moreover, an Al-containing chemical compound is provided. In addition, a Bi-containing chemical compound, a Ga-containing chemical compound and/or an In-containing chemical compound can also be provided as additional starting substance. The chemical compound that contains aluminum (Al) can be, for example, aluminum oxide ($Al_2O_3$) or corresponding precursors such as aluminum hydroxide ($Al(OH)_3$), aluminum sulfate ($Al_2(SO_4)_3$) or aluminum nitrate ($Al(NO_3)_3$) or aluminum sulfide ($Al_2S_3$), but also aluminum halide ($AlX_3$ where X=F, Cl, Br, I) or aluminum nitride (AlN). This also applies to the Bi-containing chemical compound, to the Ga-containing chemical compound and to the In-containing chemical compound which can be used additionally.

Moreover, a chemical compound that contains a halide X is provided. The formula symbol X stands for one or more elements selected from the group comprising the elements F, Cl, Br and I. The formula symbol X stands preferably for I. Iodine (I) and the other halides described in the general formula are usually used in the form of the corresponding alkali compound (for example, LiI, NaI, KI), alkaline earth compound (for example, $MgI_2$, $CaI_2$, $BaI_2$), or ammonium compound ($NH_4I$), or else in the form of bismuth iodide ($BiI_3$). The chemical compound that contains iodide (I) is thus preferably LiI, NaI, KI, $MgI_2$, $CaI_2$, $BaI_2$, $NH_4I$ and/or $BiI_3$. This also applies accordingly for X=F, X=Cl and X=Br.

The compound that contains the Al, Bi, Ga or In and the compound that contains the halide X can be identical, for example, in the form of aluminum halide ($AlX_3$) or in the form of bismuth halide ($BiX_3$).

Some of the chemical compounds provided as starting substances for carrying out the process can also act as melting agents in the subsequent thermal treatment.

Optionally, the chemical compounds provided are to be ground. The chemical compounds present in powder form first have to be mixed with one another to form a mixture.

The mixture is then annealed at temperatures between 800° C. and 1.200° C., optionally also up to 1.300° C., as a result of which the starting substances present in the mixture react to form the zinc sulfide phosphor. According to the invention, the annealing of the mixture occurs in the presence of activated carbon, the presence of which plays an important role in the adjustment of the local annealing atmosphere needed for the production of the phosphor according to the invention. The high-temperature annealing process preferably occurs under only weakly reducing conditions (annealing in an $N_2/H_2$ atmosphere with a hydrogen content of at most 6%), but it also succeeds under weakly oxidizing conditions (annealing in still air). According to the prior art, on the other hand, the high-temperature annealing process is usually carried out in a reducing atmosphere, i.e., in the presence of a gas mixture consisting of nitrogen and hydrogen, wherein the hydrogen content typically can be as much as 10%. On the other hand, as already mentioned, it is important for the invention that a fine adjustment of the local annealing atmosphere by the presence of activated carbon is possible.

The annealing of the mixture occurs preferably in a weakly reducing atmosphere consisting of nitrogen $N_2$ and hydrogen $H_2$, with 1% to 6% hydrogen. The weakly reducing atmosphere consists particularly preferably of 5% hydrogen and 95% nitrogen; alternatively it consists preferably of 1.5% hydrogen and 98.5% nitrogen.

In an alternative preferred embodiment, the annealing occurs in still air.

During the annealing process, the mixture is preferably in an annealing crucible, for example, in a dish made of fused silica or in a small vessel made of aluminum oxide. Here, a fine adjustment of the local annealing atmosphere in the individual annealing crucible is carried out in such a manner that, within the covered annealing crucible and above the compacted mixture, activated carbon is positioned, for example, using a smaller graphite crucible filled with activated carbon. In this manner, the presence of the activated carbon is achieved, as a result of which it becomes possible to control the annealing atmosphere and to prevent premature sublimation of melting agent and/or coactivator additives.

The weight of the activated carbon present is preferably between 0.0001 and 0.1 of the weight of the zinc sulfide, particularly preferably between 0.0005 and 0.05 of the weight of the zinc sulfide. The activated carbon is preferably arranged in a graphite dish arranged above the compacted mixture.

The annealing of the mixture preferably lasts at least two hours. It occurs preferably at temperatures between 850° C. and 1.200° C.

The phosphor formed then has to be cooled. Subsequently, it is ground, washed, dried and sieved according to an embodiment. In this simple case, the phosphor is then available without the need for any additional process steps.

Surprisingly, it has been shown that, for the formation of the special properties of the zinc sulfide phosphor according to the invention, it can be advantageous to dispense with a secondary doping with additional copper of the annealed material present after the high-temperature annealing. The desired luminescent properties of the phosphor according to the invention thus can be achieved with a drastically reduced process expenditure, namely without the step of secondary doping required in the prior art in the case of zinc sulfide phosphors that comprise exclusively or primarily electroluminescent properties. The processing of the annealed material can then occur simply by a gentle, deagglomerating wet grinding and the performance of several washing procedures. Consequently, in this embodiment, no treatment with a dilute mineral acid, no secondary doping of the intermediate product with Cu, and also no renewed treatment with a dilute acid and no renewed tempering occur.

In the case of the modified embodiment of the process according to the invention, the phosphor obtained after the high-temperature annealing process at first represents an intermediate product. This intermediate product is cooled and washed with $H_2O$ before the additional steps. Moreover, deagglomeration of the intermediate product occurs using ceramic beads and addition of a grinding aid such as choline base, pyrophosphate solution or potassium silicate solution. Finally, a treatment with dilute mineral acid is carried out, by means of which, in particular, the surfaces of the powder grains of the intermediate product are modified. The mineral acid is formed preferably by hydrochloric acid. In this embodiment, a secondary doping of the intermediate product with Cu occurs, as a result of which the phosphor to be produced is formed. The secondary doping occurs by feeding Cu in the form of a Cu-containing chemical compound such as $CuSO_4$ into the intermediate product.

The secondarily doped phosphor is preferably tempered, at a temperature between 200° C. and 600° C., particularly preferably between 300° C. and 500° C. The tempering preferably lasts at least one hour.

The secondarily doped phosphor can again be considered to be an intermediate product of an additional modified embodiment, and, in this case, it is treated with a dilute mineral acid after it has been tempered. The dilute acid is preferably formed by dilute nitric acid. After the treatment with the dilute acid, this intermediate product is again washed, dried and tempered. The renewed tempering occurs preferably at a temperature between 200° C. and 500° C. and, after the cooling, leads to the converted zinc sulfide phosphor.

The adjustment of the preparative conditions is important for the production of the zinc sulfide phosphor according to the invention. Starting from the production steps disclosed here, it is easily possible, optionally, to identify optimized synthesis conditions by experimentation, in spite of the complexity of the characteristic phosphor properties of the electroluminescent phosphor and in spite of the varying influence of the preparative factors. Optionally, for this purpose, only a few tests need to be carried out under laboratory conditions. On the other hand, in this connection, it should be noted explicitly that the synthesis of the phosphor according to the invention can be supplemented by process steps that are known per se.

Moreover, in the investigations for identifying suitable production conditions for the phosphor to be produced, it has been shown that the advantageous properties of these electroluminescent phosphors can be adjusted independently of the temperature, selected in the range between 800° C. and 1.300° C., for the high-temperature annealing process. However, this also means that they are formed independently of the predominantly cubic and/or hexagonal crystal structure of the ZnS matrix. Based on data from the literature, ZnS crystallizes exclusively in the cubic crystal system below a temperature of 1.020° C., while, at higher temperatures, hexagonal or, depending on the conditions of the cooling regimen, mixtures of hexagonal and cubic crystals or crystallites are obtained.

In general, the phosphor produced in the described manner comprises particles that are well deagglomerated and have mean grain sizes between approximately 2 μm and approximately 20 μm. The grain size distributions can be controlled and adjusted via the preparation conditions. The mean grain sizes of the electroluminescent phosphor according to the invention are not limited to the range mentioned as example.

The phosphor according to the invention is characterized preferably by the process according to the invention for the production thereof as well as by the specific phosphor composition described.

An additional subject matter of the invention is formed by a zinc sulfide phosphor which can be produced by the process according to the invention. This zinc sulfide phosphor can preferably be produced by preferred embodiments of the process according to the invention. This zinc sulfide phosphor has, in particular, the above-described features of the phosphor according to the invention. Preferably, this zinc sulfide phosphor has the above-described feature that Cu forms an activator, and that M and X form coactivators, wherein, due to Cu, and due to M and X, two different activatable radiation centers in the zinc sulfide phosphor are induced.

The security feature according to the invention comprises one or more embodiments of the zinc sulfide phosphor according to the invention.

The security document and/or document of value according to the invention can be, for example, a bank note or a travel passport, an identity card, a driver's license, or a postal stamp. It comprises a security feature that comprises one or more embodiments of the zinc sulfide phosphor according to the invention. The security feature can be applied or introduced in various ways onto or into the security document. Preferably, the security feature is applied by means of suitable printing technologies such as, for example, a gravure printing, an offset printing or a screen printing process into and/or onto the security document.

Moreover, in addition to the zinc sulfide phosphor according to the invention, additional field suppression elements are preferably arranged in the security document or document of value according to the invention. The field suppression elements are electrically conductive and electrically insulated within the security document. They have a high dielectric constant. They are preferably arranged in the immediate vicinity of the zinc sulfide phosphor particles. The field suppression elements consist preferably of metal particles such as iron (Fe), copper (Cu), aluminum (Al) and/or silver (Ag), or else of transparent, optically variable multi-layer effect pigments. The field suppression elements are used to increase the local field strength of the electrical field acting on the zinc sulfide phosphor.

An additional subject matter of the invention is formed by a method for the detection and/or verification of a security feature comprising a phosphor in a security document or document of value. Preferably, the method is used for the detection and/or verification of the phosphor according to the invention or of a security feature formed thereby in the respective security document.

In a step of this method, an excitation of the phosphor by an electrical field occurs. The phosphor thus is excited as an electroluminescent phosphor. Accordingly, a verification is performed to determine whether an electroluminescence in the blue and/or green region of the light spectrum can be received, which is emitted by the phosphor due to the excitation by the electrical field. Preferably, the excitation occurs by a high-frequency high-voltage field, which is directed onto the phosphor, in order to allow a reliable stationary and advantageously also high-speed detection of the receivable luminescence signals.

In an additional step of the method according to the invention, an excitation of the phosphor by irradiation of the phosphor with UV radiation in the wavelength range between 345 nm and 370 nm occurs. Accordingly, a verification is conducted to determine whether photoluminescence in the blue region of the light spectrum can be received, which is emitted by the phosphor due to excitation by UV radiation in the wavelength range between 345 nm and 370 nm.

In yet another step, an excitation of the phosphor by irradiation of the phosphor with UV radiation in the wavelength range between 310 nm and 335 nm occurs. Accordingly, a verification is conducted to determine whether photoluminescence in the green region of the light spectrum can be received, which is emitted by the phosphor due to excitation by UV radiation in the wavelength range between 310 nm and 335 nm.

If, by means of the process, a phosphor according to the invention or a corresponding security feature is to be tested with high test security (improved as level 3), then all three occurring emissions are tested and verified. In particular, in addition to the electroluminescence of the phosphor according to the invention, a verification is thus conducted to determine whether a color change, independent of the electroluminescence, of the photoluminescence excited with shorter or longer wave UV radiation can be detected. The represented excitations and detections can occur at the same time, successively or alternatingly relative to one another.

In a modified embodiment, the excitation of the level 3 feature electroluminescence is dispensed with, and only the level 2 feature based on the color shift of the photoluminescence emissions produced in the case of alternating UV excitation wavelengths is detected. In this case as well, the excitation and detection can occur temporally and spatially separately or simultaneously in a compact apparatus.

The security document is preferably detected and/or verified if the electroluminescence in the blue and/or green region of the light spectrum, the photoluminescence in the blue region of the light spectrum, and the photoluminescence in the green region of the light spectrum have been received. This moreover presupposes that the photoluminescence in the blue region of the light spectrum was received exclusively during the excitation of the phosphor by UV radiation in the wavelength range between 345 nm and 370 nm, and that the photoluminescence in the green region of the light spectrum was received exclusively during the excitation of the phosphor by UV radiation in the wavelength range between 310 nm and 335 nm.

BRIEF DESCRIPTION OF THE DRAWINGS

Further details and advantages of the invention are described below in reference to embodiment examples and the drawing.

DETAILED DESCRIPTION OF THE INVENTION

Figure 1:
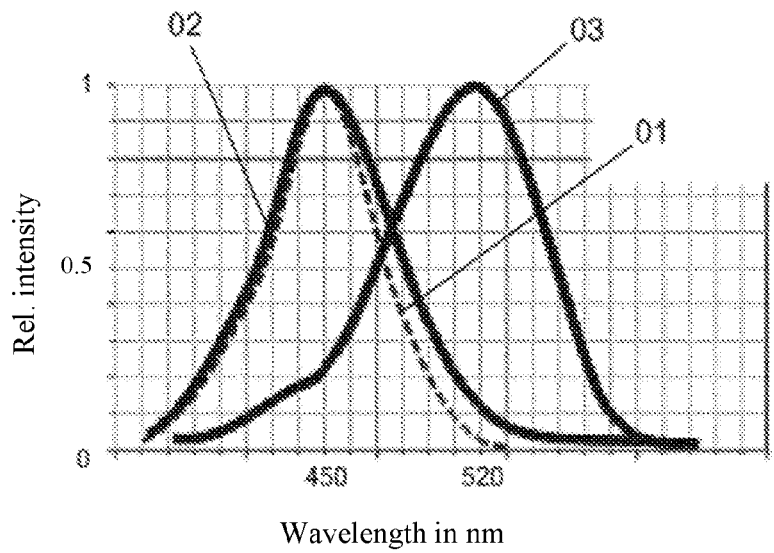
FIG. 1 shows an emission spectra of a first general embodiment of the phosphor according to the invention.

It is apparent from FIG. 1 that, in the case of the phosphor composition selected here and the applied production conditions for the electroluminescence 01 of a first general embodiment of the phosphor according to the invention, and for the photoluminescence 02 excited at 365 nm, nearly identical emission spectra were determined. Both in the case of the EL excitation and also in the case of UV-A excitation, the phosphor emits in broad-band form in the blue spectral region with a maximum wavelength $\lambda_{max}$ of approximately 450 nm. On the other hand, if the phosphor is excited in the UV-B region at an excitation wavelength of 313 nm, the result is a broad-band green emission 03 that is clearly shifted towards long wavelengths and has a maximum of approximately 520 nm. The photoluminescence 02, 03 thus has a considerable color shift which, using as the basis the separation of the maximum wavelengths, is approximately 70 nm.

Figure 2:
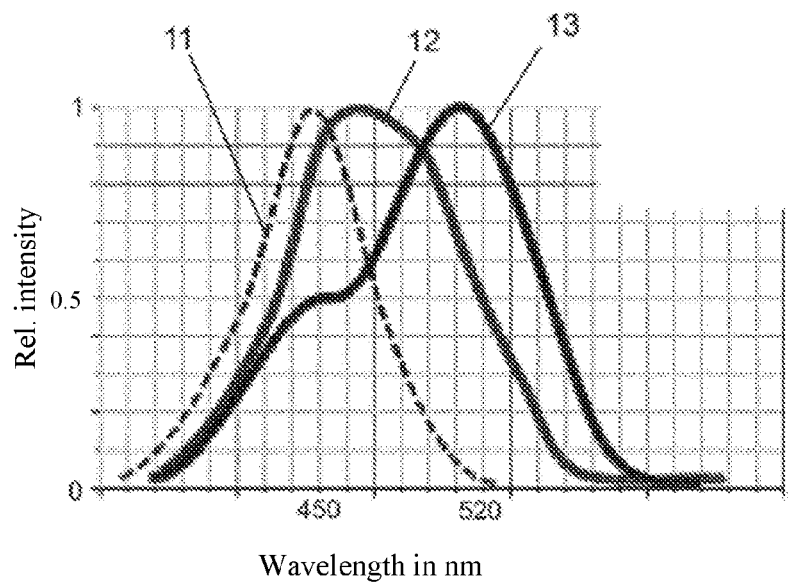
FIG. 2 shows an emission spectra of a second general embodiment of the phosphor according to the invention.

In FIG. 2, corresponding emission spectra 11, 12, 13 are represented for an additional exemplary general embodiment of the phosphor according to the invention. In this case as well, a clear color shift is observed between the UV-A excited photoluminescence 12 and the UV-B excited photoluminescence 13 of the electroluminescent phosphor according to the invention, for which one gets a value of approximately 50 nm, using the described criteria. On the other hand, it should be noted that, in the embodiment of the phosphor according to the invention that is selected here, a spectral shift towards longer wavelengths is also registered between the emission spectrum 11 for the electroluminescence and the emission spectrum 12 at 365 nm excitation.

Like the electroluminescent EL pigments known from the prior art, the zinc sulfide electroluminescent phosphor according to the invention can also and advantageously be used instead of said pigments, for the purpose of protection against counterfeiting, as security features in security documents and documents of value such as bank notes, travel passports, identity cards, driver's license, identity cards, access control identification cards, health insurance cards, postal stamps, bank cards, credit cards, smart cards, tickets or labels. For this purpose, the phosphor is usually applied by means of conventional printing technologies such as, for example, flexography printing, offset printing, gravure printing or screen printing processes onto or into the matrix of the materials used for the respective security documents. In order to increase the intensity of the electroluminescence thereof, the EL phosphor according to the invention can also be mixed with the described field suppression elements. The selection of the printing processes to be used depends then, among other factors, on the adjusted grain size distribution of the electroluminescent phosphor according to the invention and on that of the field suppression elements used.

The identification of the level 3 characteristic of the security feature based on the phosphor according to the invention is achieved by the excitation of the phosphor particles with high-frequency high-voltage alternating fields.

However, the decisive advantage of the phosphor according to the invention and the security features according to the invention based thereon is that they have, in addition to the special electroluminescent feature, at least one additional exclusive phosphor property with level 2 status, which can be used in addition to or alternatively to the electroluminescence phenomenon for the authenticity verification of corresponding security documents or documents of value. This relates to the described characteristic color changes of the photoluminescence of the phosphor according to the invention in the case of a variation of the UV excitatory conditions.

If, in preferred embodiments of the phosphor according to the invention, the security feature according to the invention or the corresponding security document and document of value, for the purpose of increasing the effective local strength of the excitatory electric field and thus the signal strength of the resulting electroluminescence of the feature, in addition to the EL phosphors, so-called field suppression elements in the form of electrically conductive, optically variable effect pigments are used, then the feature can also have, in addition to the level 3 and the level 2 status, a corresponding level 1 characteristic. The optical effect of these pigments, which consists of a color change that can be perceived by the observer under different illumination and viewing angles, can be used as an additional feature in the authenticity verification.

The described features of the phosphor according to the invention thus allow the generation of luminescent security features which have all the classified authenticity features to be associated with different security levels. As a result, both the exclusivity of the corresponding features and also the possibilities of a cost-optimized authenticity detection can be increased.

The clear shifts of the emissions produced in the visible spectral region in the case of excitation with UV-A or UV-B radiation, which are characteristic for the phosphor according to the invention, can be detected easily and reliably. For this purpose, the person skilled in the art uses the available knowledge of optical spectroscopy.

Thus, the excitation of the phosphor according to the invention with UV radiation of different wavelength ranges can be implemented, for example, by means of suitable UV-LED that can be operated stationarily or pulsed, or else by using UV-emitting phosphor lamps, preferably with the use of corresponding lamps of the CCFL type. The detection of the luminescence radiation produced in the case of different excitatory conditions can occur, for example, using appropriate cameras, using photodiodes, which can optionally be combined with optical filters, or using CCD lines or suitable spectrometers.

The synthesis according to the invention of the phosphor according to the invention is represented below in reference to examples.

Example 1

Figure 3:
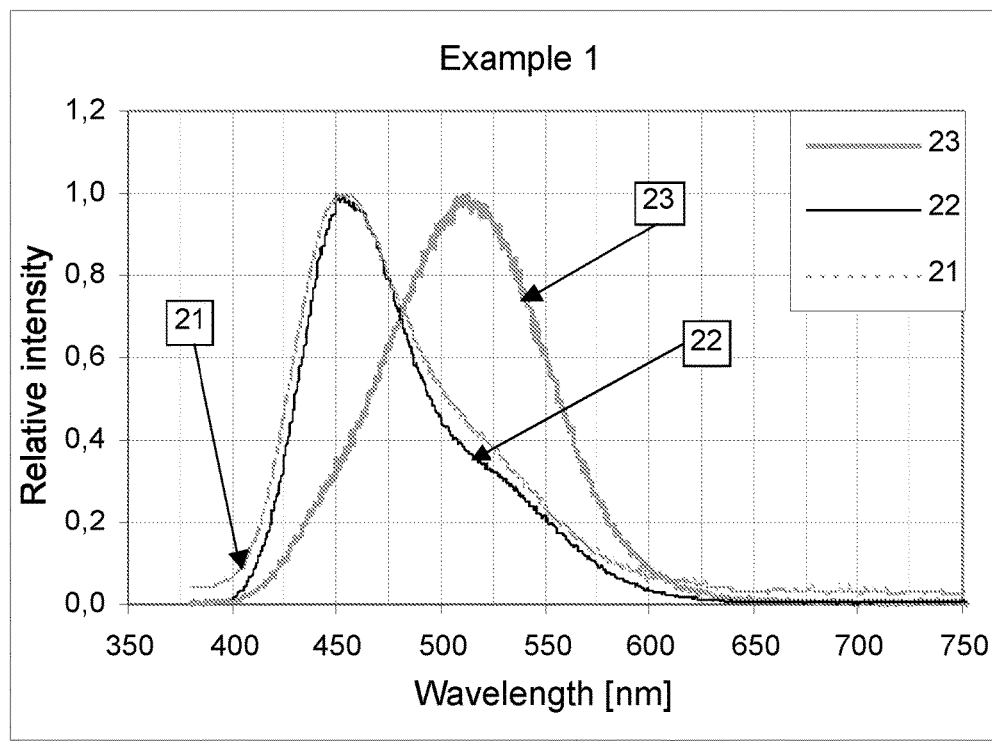
FIG. 3 shows an emission spectra of a first preferred embodiment of the phosphor according to the invention.

1.742.6 g ZnS, 2.3948 g $CuSO_4*5H_2O$, 4.352 g $BiI_3$, 2.614 g $AlF_3$ and 52.275 g S are thoroughly mixed. For this purpose, all known mixer types such as V mixers, tumblers or round-bottomed pot mixers are suitable. The mixture is filled into dish made of fused silica and covered with a graphite dish containing 1.74 g activated carbon; the annealing dish is closed off with a cover made of fused silica. In a chamber furnace, the reaction takes place in a 5% $H_2$/95% $N_2$ atmosphere at 1.000° C. within 3 h. After repeated washing with hot water and deagglomeration using ceramic beads and with the addition of the grinding aid choline base, the material is treated for several hours with 32% hydrochloric acid. The phosphor that has been washed again is subjected to secondary doping with 0.1 g Cu per kg phosphor and, after drying, is tempered for 2 h at approximately 500° C. Finally, a treatment with 1:10 dilution of nitric acid occurs, followed by renewed washing with water, drying, tempering at 300° C., and the final sieving. The resulting example of the zinc sulfide phosphor according to the invention has the chemical formula $ZnS:Cu_{0.00069}Al_{0.00174}Bi_{0.00041}I_{0.00124}F_{0.00522}$, which can be determined using a conventional measurement procedure. FIG. 3 shows emission spectra of this example of the phosphor according to the invention, namely an emission spectrum 21 of the electroluminescence, an emission spectrum 22 of the UV-A excited photoluminescence and an emission spectrum 23 of the UV-B excited photoluminescence.

Example 2

Figure 4:
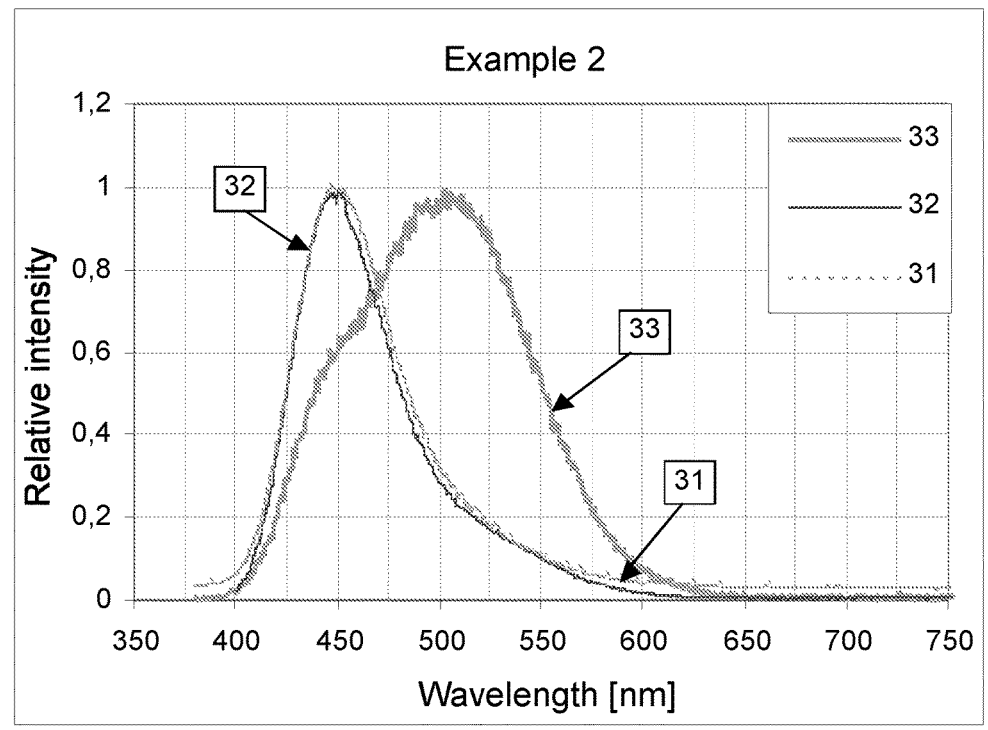
FIG. 4 shows an emission spectra of a second preferred embodiment of the phosphor according to the invention.

11.592 g ZnS, 33.526 g $CuSO_4*5H_2O$, 4.032 g $BiI_3$, 36.596 g $AlF_3$ and 365.925 g S are thoroughly mixed as in Example 1. In each case ⅙ of the mixture is filled into a respective dish made of fused silica and covered with a graphite dish containing 12 g activated carbon per kilogram phosphor; the annealing dish is closed off with a cover made of fused silica. In a push-through furnace, the reaction takes place in a 5% $H_2$/95% $N_2$ atmosphere at 850° C. to 1.000° C. within 3 h. After repeated washing with hot water and deagglomeration using ceramic beads and with the addition of a potassium silicate solution as grinding aid, the material is treated for several hours with 32% hydrochloric acid. The phosphor that has been washed again is subjected to secondary doping with 0.15 g Cu per kg phosphor and, after drying, is tempered for 2 h at approximately 500° C. Finally, a treatment with a 1:10 dilution of nitric acid is carried out, followed by renewed washing with water, drying, tempering at 300° C., and the final sieving. The resulting example of the zinc sulfide phosphor according to the invention has the chemical formula $ZnS:Cu_{0.00128}Al_{0.00366}Bi_{0.000058}I_{0.00017}F_{0.01099}$, which can be determined using a conventional measurement procedure. FIG. 4 shows emission spectra of this example of the phosphor according to the invention, namely an emission spectrum 31 of the electroluminescence, an emission spectrum 32 of the UV-A excited photoluminescence, and an emission spectrum 33 of the UV-B excited photoluminescence.

Example 3

Figure 5:
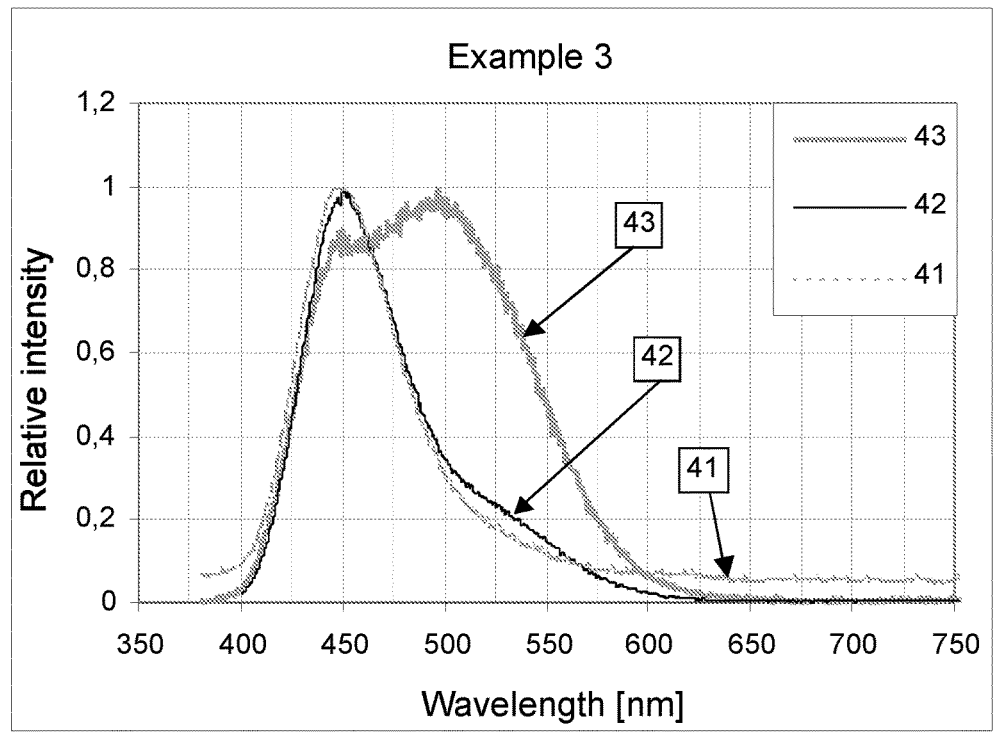
FIG. 5 shows an emission spectra of a third preferred embodiment of the phosphor according to the invention.

11.592 g ZnS, 33.526 g $CuSO_4*5H_2O$, 4.269 g $BiI_3$, 6.2 g $AlCl_3$, 69.552 g $MgAl_2O_4$, 10 g $BiI_2$, 30 g NaI, 30 g $NH_4Br$ and 365.925 g S are thoroughly mixed as in Example 1, wherein care must be taken to largely exclude humidity. In each case, ⅙ of the mixture is filled into a respective dish made of fused silica and covered with a graphite dish containing 12 g activated carbon per kilogram phosphor; the annealing dish is closed off with a cover made of fused silica. The reaction takes place in a push-through furnace in a 1.5% $H_2$/98.5% $N_2$ atmosphere at 850° C. to 1.100° C. within 3 h. After repeated washing with hot water and deagglomeration using ceramic beads, and with addition of a pyrophosphate solution as grinding aid, the material is treated for several hours with 32% hydrochloric acid. The phosphor that has been washed again is submitted to secondary doping with 0.1 g Cu per kg phosphor and, after drying, is tempered for 2 h at approximately 500° C. Subsequently, a treatment with a 1:10 dilution of nitric acid occurs, followed by renewed washing with water, drying, tempering at 300° C., and the final sieving. The resulting example of the zinc sulfide phosphor according to the invention has the chemical formula $ZnS:Cu_{0.00127}Al_{0.0086}Bi_{0.00006}I_{0.00229}Cl_{0.00177}Br_{0.00257}$, which can be determined using a conventional measurement procedure. FIG. 5 shows emission spectra of this example of the phosphor according to the invention, namely an emission spectrum 41 of the electroluminescence, an emission spectrum 42 of the UV-A excited photoluminescence, and an emission spectrum 43 of the UV-B excited photoluminescence.

Example 4

Figure 6:
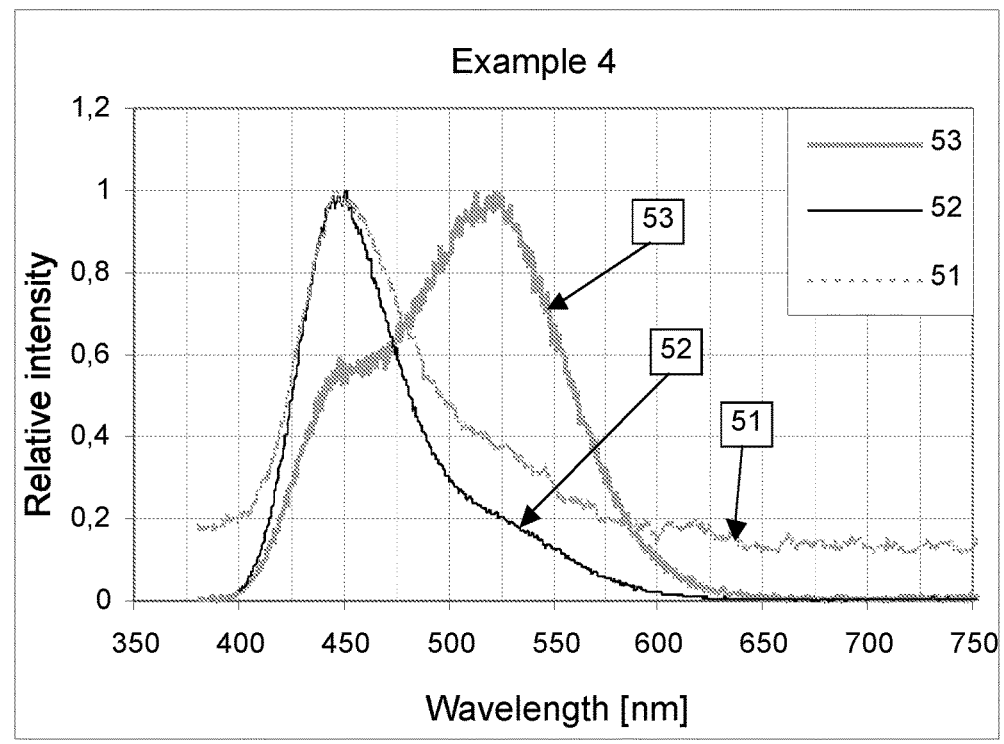
FIG. 6 shows an emission spectra of a fourth preferred embodiment of the phosphor according to the invention.

3.325.13 g ZnS, 9.1456 g $CuSO_4*5H_2O$, 6.62 g $AgNO_3$, 8.704 g $InBr_3$, 10.455 g $AlF_3$ and 104.55 g S are thoroughly mixed as in Example 1. In each case, ½ of the mixture is filled into a respective dish made of fused silica; a small vessel made of aluminum oxide containing 18 g activated carbon per kilogram phosphor is placed over the mixture. The annealing dish is closed off with a cover made of fused silica. The reaction takes place in a push-through furnace in a 1.5% $H_2$/98.5% $N_2$ atmosphere at 1.150° C. within 3 h. After repeated washing with hot water and deagglomeration using ceramic beads, and with addition of a pyrophosphate solution as grinding aid, the material is treated for several hours with 32% hydrochloric acid. The phosphor that has been washed again is subjected to secondary doping with 0.1 g Cu per kg phosphor and, after drying, is tempered for 2 h at approximately 500° C. Subsequently, a treatment with a 1:10 dilution of nitric acid occurs, followed by renewed washing with water, drying, tempering at 300° C., and the final sieving. The resulting example of the zinc sulfide phosphor according to the invention has the chemical formula $ZnS:Cu_{0.00122}Ag_{0.00144}Al_{0.00364}In_{0.00072}Br_{0.00216}F_{0.0109}$, which can be determined using a conventional measurement procedure. FIG. 6 shows emission spectra of this example of the phosphor according to the invention, namely an emission spectrum 51 of the electroluminescence, an emission spectrum 52 of the UV-A excited photoluminescence, and an emission spectrum 53 of the UV-B excited photoluminescence.

Example 5

Figure 7:
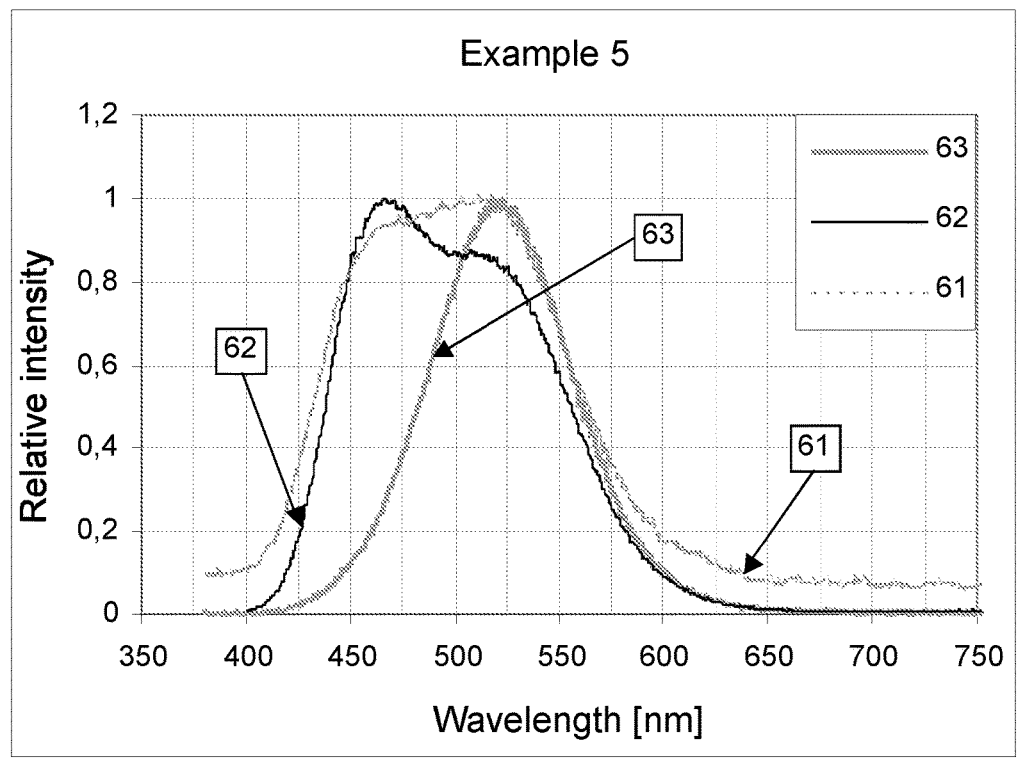
FIG. 7 shows an emission spectra of a fifth preferred embodiment of the phosphor according to the invention.

3.325.13 g ZnS, 9.1456 g $CuSO_4*5H_2O$, 8.704g $BiI_3$, 10.455 g $AlF_3$ and 104.55 g S are thoroughly mixed as in Example 1. The mixture is filled into a dish made of fused silica and covered with a graphite dish containing 22 g activated carbon per kilogram phosphor; the annealing dish is closed off with a cover made of fused silica. The reaction takes place in a push-through furnace in air at 1.000° C. to 1.100° C. within 3 h. After repeated washing with hot water and deagglomeration using ceramic beads, and with addition of the grinding aid choline base, it is washed again. After drying, the final sieving takes place. No secondary doping of Cu takes place. The resulting example of the zinc sulfide phosphor according to the invention has the chemical formula $ZnS:Cu_{0.00122}Al_{0.003649}Bi_{0.00043}I_{0.00129}F_{0.0109}$, which can be determined using a conventional measurement procedure. FIG. 7 shows emission spectra of this example of the phosphor according to the invention, namely an emission spectrum 61 of the electroluminescence, an emission spectrum 62 of the UV-A excited photoluminescence, and an emission spectrum 63 of the UV-B excited photoluminescence.

Example 6

Figure 8:
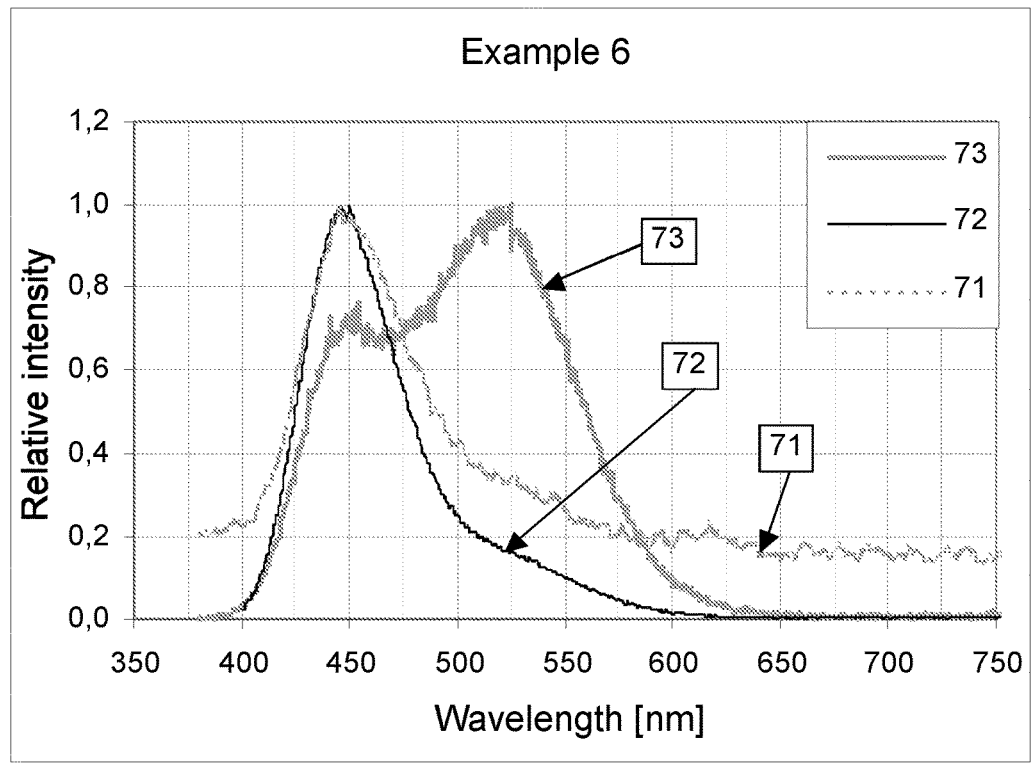
FIG. 8 shows an emission spectra of a sixth preferred embodiment of the phosphor according to the invention.

3.325.13 g ZnS, 8.5 g $CuSO_4*5H_2O$, 2.1 g $Na_3[AuCl_4]$, 6.225 g NaBr, 8.704 g $BaI_2$, 1.98 g $GaF_3$, 8.55 g $AlF_3$ and 104.55 g S are thoroughly mixed as in Example 1. The mixture is filled into dish made of fused silica and covered with a graphite dish; the annealing dish is closed off with a cover made of fused silica. The reaction takes place in a push-through furnace in a 5% $H_2$/95% $N_2$ atmosphere at 1.000° C. within 3 h. After repeated washing with hot water and deagglomeration using ceramic beads, and with addition of the grinding aid choline base, the material is treated for several hours with 32% hydrochloric acid. The phosphor that has been washed again is subjected to secondary doping with 0.1 g Cu per kg phosphor, and, after drying, is tempered for 2 h at approximately 500° C. Subsequently, a treatment with a 1:10 dilution of nitric acid occurs, followed by renewed washing with water, drying, tempering at 300° C., and the final sieving. The resulting example of the zinc sulfide phosphor according to the invention has the chemical formula $ZnS:Cu_{0.001151}Au_{0.000151}Al_{0.00298}Ga_{0.000458}I_{0.0013}F_{0.00895}Br_{0.00177}$, which can be determined using a conventional measurement process. FIG. 8 shows emission spectra of this example of the phosphor according to the invention, namely an emission spectrum 71 of the electroluminescence, an emission spectrum 72 of the UV-A excited photoluminescence, and an emission spectrum 73 of the UV-B excited photoluminescence.

LIST OF REFERENCE NUMERALS

01 —Emission spectrum of the electroluminescence
02 —Emission spectrum of the photoluminescence with UV-A excitation
03 —Emission spectrum of the photoluminescence with UV-B excitation
11 —Emission spectrum of the electroluminescence
12 —Emission spectrum of the photoluminescence with UV-A excitation
13 —Emission spectrum of the photoluminescence with UV-B excitation
21 —Emission spectrum of the electroluminescence
22 —Emission spectrum of the photoluminescence with UV-A excitation
23 —Emission spectrum of the photoluminescence with UV-B excitation
31 —Emission spectrum of the electroluminescence
32 —Emission spectrum of the photoluminescence with UV-A excitation
33 —Emission spectrum of the photoluminescence with UV-B excitation
41 —Emission spectrum of the electroluminescence
42 —Emission spectrum of the photoluminescence with UV-A excitation
43 —Emission spectrum of the photoluminescence with UV-B excitation
51 —Emission spectrum of the electroluminescence
52 —Emission spectrum of the photoluminescence with UV-A excitation
53 —Emission spectrum of the photoluminescence with UV-B excitation
61 —Emission spectrum of the electroluminescence
62 —Emission spectrum of the photoluminescence with UV-A excitation
63 —Emission spectrum of the photoluminescence with UV-B excitation
71 —Emission spectrum of the electroluminescence
72 —Emission spectrum of the photoluminescence with UV-A excitation
73 —Emission spectrum of the photoluminescence with UV-B excitation

The invention claimed is:

1. A zinc sulfide phosphor, which, in the case of excitation by an electric field, emits in the blue and/or green region of the light spectrum, in the case of excitation by UV radiation in the wavelength range between 345 nm and 370 nm, emits in the blue region of the light spectrum, and, in the case of excitation by UV radiation in the wavelength range between 310 nm and 335 nm, emits in the green region of the light spectrum; wherein the emission in the case of excitation by UV radiation in the wavelength range between 345 nm and 370 nm differs from the emission in the case of excitation by UV radiation in the wavelength range between 310 nm and 335 nm; and wherein the phosphor has the following general chemical formula:

$ZnS:A_a, M_b, X_c$ where:

A=Cu, where Cu can be replaced proportionally by Ag and/or Au;

M=Al, where Al can be replaced proportionally by Bi, Ga and/or In;

X=one or more halides, selected from the group comprising the elements F, Cl, Br and I;

$0<(a+b+c)<0.12$;

$0.0001<a<0.008$;

$0.6 \cdot a<b<4 \cdot a$, and $2 \cdot b<c<4 \cdot b$.

2. The zinc sulfide phosphor according to claim 1, wherein Cu forms an activator and M and X form coactivators, wherein, due to Cu and due to M and X, two different activatable radiation centers are induced in the zinc sulfide phosphor.

3. The zinc sulfide phosphor according to claim 1, wherein the phosphor is in the form of a powder and has a mean grain size between 2 μm and 20 μm.

4. A security feature that comprises a zinc sulfide phosphor according to claim 1.

5. A security document or document of value with a security feature that comprises a zinc sulfide phosphor according to claim 1.

6. A method for detecting and/or verifying, in a security document or document of value, a security feature that comprises a phosphor according to claim 1, comprising the following steps:
   a. exciting the phosphor by irradiation of the phosphor with UV radiation in the wavelength range between 345 nm and 370 nm;
   b. testing whether radiation in the blue region of the light spectrum is received, which is emitted by the phosphor due to the excitation by the UV radiation in the wavelength range between 345 nm and 370 nm;
   c. exciting the phosphor by irradiation of the phosphor with UV radiation in the wavelength range between 310 nm and 335 nm; and
   d. testing whether radiation in the green region of the light spectrum is received, which is emitted by the phosphor due to the excitation by the UV radiation in the wavelength range between 310 nm and 335 nm.

7. The method according to claim 6, further comprising the steps of:
   e. exciting the phosphor by an electric field; and
   f. testing whether, due to the excitation by the electric field, radiation in the blue and/or green region of the light spectrum is emitted.

8. The method according to claim 6, wherein in each case, a confirmation signal is generated if, in one of the listed testing steps b., d. and/or f., the occurrence of the tested radiation is detected.

9. The method according to claim 8, wherein a level 2 confirmation signal is issued, if, in testing steps b. and d., the occurrence of the tested radiation is detected, and in that a level 3 confirmation signal is issued, if, in testing steps b. and d. and f., the occurrence of the tested radiation is detected.

10. A process for producing a zinc sulfide phosphor, comprising the steps of:
(a) producing a mixture which consists at least of:
ZnS;
a Cu-containing compound;
a compound containing a halogen X, where X is selected from the group comprising the elements F, Cl, Br and I;
an Al-containing compound;
(b) annealing the mixture to a temperature between 800° C. and 1,300° C., as a result of which the mixture reacts to form the zinc sulfide phosphor, wherein the annealing of the mixture occurs in the presence of activated carbon and/or graphite dish;
(c) cooling the annealed mixture; and
(d) washing, as well as optionally grinding and sieving the zinc sulfide phosphor; wherein elemental sulfur is provided as an additional substance and blended into the mixture with the other substances provided.

11. The process according to claim 10, wherein the cooled zinc sulfide phosphor at first represents an intermediate product, and then further comprising the steps of:
(a) etching the intermediate product with a mineral acid;
(b) secondary doping of the intermediate product with Cu;
(c) drying the secondarily doped intermediate product;
(d) tempering the dried intermediate product at a temperature between 200° C. and 600° C.;
(e) treating the tempered intermediate product with a dilute mineral acid;
(f) washing and drying the intermediate product; and
(g) tempering the intermediate product at a temperature between 200° C. and 500° C., as a result of which the zinc sulfide phosphor is obtained.

12. The process according to claim 10, wherein the annealing of the mixture occurs in air.

13. The process according to claim 10, wherein the annealing of the mixture occurs in an $N_2/H_2$ atmosphere with a hydrogen content between 1% and 6%.

14. A zinc sulfide phosphor that can be produced by a process comprising the steps of:
(a) producing a mixture which consists at least of:
ZnS;
a Cu-containing compound;
a compound containing a halogen X, where X is selected from the group comprising the elements F, Cl, Br and I;
an Al-containing compound;
(b) annealing the mixture to a temperature between 800° C. and 1,300° C., as a result of which the mixture reacts to form the zinc sulfide phosphor, wherein the annealing of the mixture occurs in the presence of activated carbon;
(c) cooling the annealed mixture; and
(d) washing, as well as optionally grinding and sieving of the zinc sulfide phosphor; wherein elemental sulfur is provided as an additional substance and blended into the mixture with the other substances provided.

* * * * *